Feb. 22, 1938. L. G. S. BROOKER ET AL 2,108,845
PHOTOGRAPHIC EMULSIONS CONTAINING TRINUCLEAR CYANINE DYES
Filed April 24, 1936

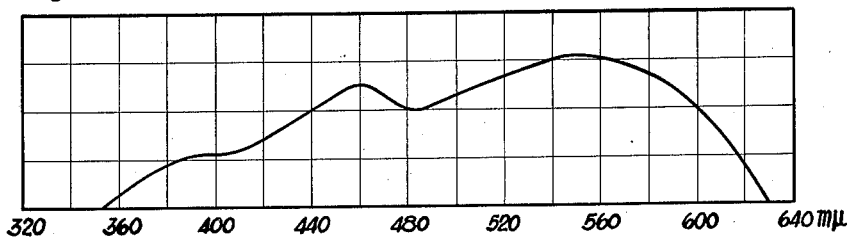

Fig.1. Chloride emulsion with 2,4-di-[(2-ethyl-1(2)-benzothiazylidene)methyl]quindine ethiodide

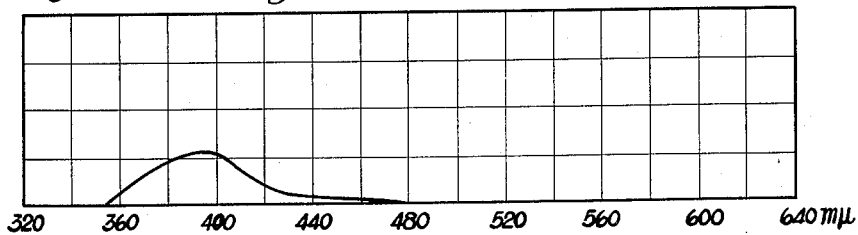

Fig.2. Unsensitized chloride emulsion

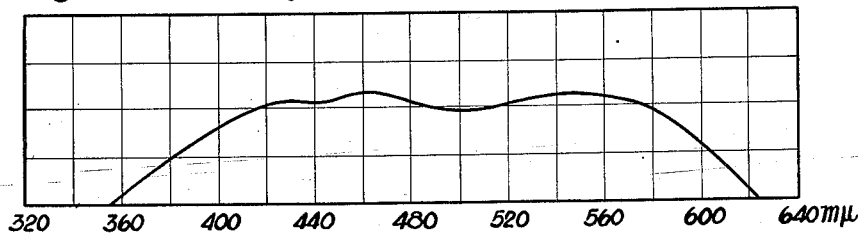

Fig.3. Bromide emulsion with 2,4-di-[(2-ethyl-1(2)-benzothiazylidene)methyl]quinoline ethiodide

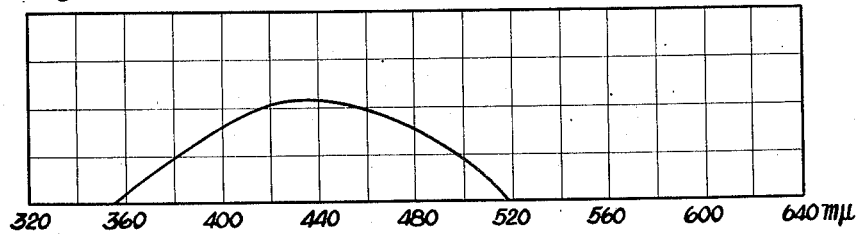

Fig.4. Unsensitized bromide emulsion

Leslie G. S. Brooker & Lloyd A. Smith,
INVENTORS
BY
ATTORNEYS.

Patented Feb. 22, 1938

2,108,845

UNITED STATES PATENT OFFICE 2,108,845

PHOTOGRAPHIC EMULSIONS CONTAINING TRINUCLEAR CYANINE DYES

Leslie G. S. Brooker and Lloyd A. Smith, Rochester, N. Y., assignors, by mesne assignments, to Eastman Kodak Company, Jersey City, N. J., a corporation of New Jersey Application April 24, 1936, Serial No. 76,185

17 Claims. (Cl. 95—7)

This invention relates to photographic emulsions and more particularly to photographic emulsions containing, as light sensitive material, silver salts, and containing, as sensitizing material, cyanine dyes. The particular cyanine dyes, with which the hereinbelow described emulsions are sensitized, are trinuclear dyes. These trinuclear dyes have been found to increase the normal sensitivity of photographic emulsions, both as to intensity and range.

The fact that certain cyanine dyes will affect the normal sensitivity of photographic emulsions is known, but all cyanine dyes will not sensitize, and the type of sensitivity conferred upon photographic emulsions by these trinuclear dyes is novel.

The trinuclear dyes employed in this invention are, in themselves, new. The dyes each consist of a pyridine-type nucleus attached to the alpha and gamma positions of which by methenyl groups are two further pyridine-type or two azole nuclei, the two further pyridine-type or two azole nuclei being linked through their alpha or gamma, i. e., their so-called reactive, positions and one of the three nuclear nitrogen atoms of the trinuclear dye being in the form of a quaternary salt. These new trinuclear dyes differ from the previously known trinuclear dyes of the neocyanine type, since in the latter, two nuclei are linked by a three-carbon conjugated chain, the third nucleus forming part of a group attached to one of the carbon atoms of this chain.

To illustrate the structure of these new dyes, a specific dye is herewith formulated:

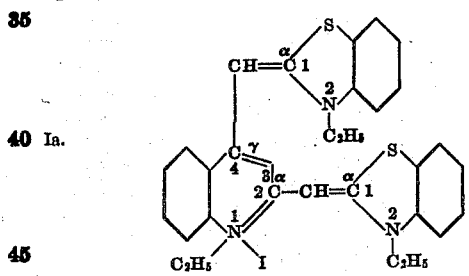

This above formulated dye we propose to call, in accordance with accepted chemical nomenclature, 2,4-di-[(2-ethyl-1(2)-benzothiazylidene) methyl] quinoline ethiodide. The alpha and gamma positions of the nuclei are pointed out. The following are alternative structures of this compound:

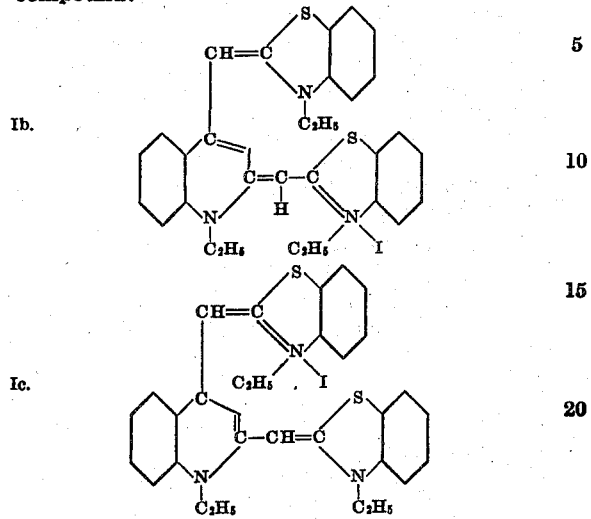

The three tautomeric forms are not distinguishable one from another and all three forms are known by the one name given above.

We do not intend that this above illustration limit our invention in any manner. In its broader aspect, our invention includes photographic silver salt emulsions containing any sensitizing dye or combination of sensitizing dyes selected from the group whose general structure falls within the above stated definition. A preferred embodiment of our invention embraces photographic silver salt emulsions containing any sensitizing dye or combination of dyes selected from the group represented by the following general formula:

wherein A represents a vinylene, a phenylene or a naphthylene group, $A_1$ and $A_2$ represent a vinylene, an ethylene, a phenylene or a naphthylene group, R, $R_2$ and $R_4$ represent alkyl groups, $R_1$ and $R_3$ represent hydrogen or a lower alkyl group, X represents an acid radical which is advantageously a halide especially iodide and Y represents oxygen, sulfur or selenium. The dyes wherein nucleus I is a quinoline nucleus and nuclei II and III are benzothiazole or benzoselenazole are particularly useful in sensitizing photographic emulsions. When nucleus I is a quinoline nucleus and nuclei II and III are benzoxazole nuclei, the sensitizing properties of the dye are less useful for most purposes. Likewise, when the three nuclei are all quinoline nuclei, the dyes are not as marked in their sensitizing properties. Substituents on the various nuclei, such as methyl, ethyl, ethoxy, chloro, acetyl and the like have little or no effect on the sensitizing activity of these trinuclear dyes and are accordingly to be considered as equivalents of the unsubstituted nuclei and within the scope of the present invention.

Any of these new trinuclear dyes can be prepared by condensing one molecular proportion of a 2,4-dihalogenopyridine-type quaternary salt (a) with two molecular proportions of a cyclammonium quaternary salt containing a reactive alkyl group (b), in the presence of a basic condensing agent, preferably a strong tertiary organic base. It is advantageous to employ an excess of (b) as a higher yield of the dye usually results. The following example serves to illustrate the preparation of one of our new dyes. This example is not intended to limit our invention in any way, however.

*Example 1.—2,4-di-[(2-ethyl-1(2)-benzothiazylidene)methyl]quinoline ethiodide*

1.34 g. (1 mol.) of 2,4-diiodoquinoline ethiodide, 3.5 g. (4 mol.) of 1-methylbenzothiazole etho-p-toluene-sulfonate, 2.15 cc. (6.2 mol.) of triethylamine and 50 cc. of absolute ethyl alcohol were refluxed for forty minutes. Solid separated on cooling, but this was not the dye sought for and was removed. Ether was added to the filtrate and the dye separated. Yield 0.25 g. (15%). After two recrystallizations from methyl alcohol (50 cc. per g.) the yield was 3%. The minute brownish crystals with greenish reflex had a melting point of 274–276° C. with decomposition.

2,4-di-[(2-methyl-1(2)-benzothiazylidene)-methyl] quinoline methiodide prepared, isolated and purified in the same manner formed a brown felt of minute crystals with a greenish reflex and melted at 310–312° C. with decomposition.

In a similar manner other trinuclear alkiodides can be prepared. Instead of salts of 2,4-diiodoquinoline, salts of 2,4-diiodo-β-naphthoquinoline or the like can be used. Instead of 1-methylbenzothiazole, 1-ethylbenzothiazole, 2-methylthiazole, 2-methylthiazoline, 1-methylbenzoxazole, 1-methylbenzoselenazole, μ-methyl-α- or -β-naphthothiazole, quinaldine, β-naphthoquinaldine or the like can be used.

In the case of those trinuclear dyes containing three pyridine-type nuclei, an alternative method of preparation can be used as illustrated in the following example:

*Example 2.—2,4-di-[(1-ethyl-2(1)-quinolylidene)methyl]quinoline ethiodide*

3.1 g. (1 mol.) of 2,4-dimethylquinoline ethiodide 16.4 g. (4 mol.) of 2-iodoquinoline ethiodide, 8.7 cc. (6.2 mol.) of triethylamine and 40 cc. of absolute ethyl alcohol were refluxed for forty minutes. The dye separated on cooling and was washed with acetone and then with water. The dye was recrystallized three times from methyl alcohol and was finally obtained pure in the form of dull bronze crystals, melting at 291–292° C. with decomposition.

The new trinuclear dyes show an unusual sensitizing action in photographic silver halide emulsions, particularly silver chloride emulsions. Accordingly, our invention is particularly directed to the customarily employed silver halide emulsions. However, the light-sensitive material employed in the emulsions of our invention can be any light-sensitive silver salt alone or combined with another light-sensitive silver salt, such as a silver halide. Our invention is further particularly directed to the customarily employed gelatin emulsions, gelatin being the carrier or medium in which the light-sensitive salt is suspended. However, any other suitable carrier, such as a cellulose derivative or a synthetic resin which has substantially no desensitizing effect on the silver salt, can be used.

The sensitizing effect of these new trinuclear dyes will be illustrated with reference to gelatino-silver-chloride and bromide emulsions. 2,4-di-[(2-ethyl-1(2)-benzothiazylidene)methyl] quinoline ethiodide in an ordinary gelatino-silver-chloride emulsion increases the normal range of sensitivity of the emulsion to about 630 mu. The sensitized emulsion shows a sharp maximum at 460 mu and another broad maximum at 550 mu. Between the maxima there is a distinct minimum, though not a complete gap, at about 485 mu. 2,4-di-[(2-methyl-1(2)-benzothiazylidene)methyl] quinoline methiodide confers a similar type of, though somewhat stronger, sensitivity upon silver chloride emulsions. Likewise, 2,4-di-[(2-methyl-1(2)-benzoselenazylidene)methyl] quinoline ethiodide confers a similar type of sensitivity upon chloride emulsions. The accompanying drawing shows, in Figure 1, a diagrammatic spectrogram of the sensitizing effect of the above-mentioned benzothiazylidene ethiodide. Figure 2, for purposes of comparison, shows the same silver chloride emulsion without the sensitizing dye. In Figure 3 of the drawing, the diagrammatic spectrogram of the sensitizing effect of the same dye, viz. 2,4-di-[(2-ethyl-1(2)-benzothiazylidene)methyl] quinoline ethiodide, in an ordinary gelatino-silver-bromide emulsion is shown. Here the range of sensitivity is extended to about 625 mu. There is a maximum at about 465 mu and another broader maximum at about 555 mu. The maximum at about 465 mu is very near the normal maximum of the non-sensitized silver bromide emulsion. Again there is a distinct depression in sensitivity between the two maxima of extraordinary sensitivity. Figure 4, for purposes of comparison, shows the same silver bromide emulsion without the sensitizing dye. In a similar manner, the other cyanine dyes of this new group sensitize silver halide emulsions, the sensitized emulsions always showing two maxima, one near the region of ordinary sensitivity, the other farther toward the longer wavelengths and always there is a distinct depression in the intensity of sensitization between the two maxima. Cyanine dyes which give two sensitizing bands separated by such a pronounced minimum have not hitherto been known. Some of the dyes of this new group of trinuclear cyanine dyes are stronger in sensitizing action than others, for example, 2,4-di-[(2-ethyl-1(2)-benzothiazylidene)methyl] quinoline methiodide is stronger than 2,4-di-[(2-ethyl-2(1)-quinolylidene)methyl] quinoline ethiodide.

In general, the dyes of this new class which contain thiazole, particularly benzothiazole or naphthothiazole, or selenazole, particularly benzoselenazole and naphthoselenazole nuclei are the stronger sensitizers.

In the preparation of photographic emulsions containing these new dyes, it is only necessary to disperse, homogeneously and uniformly, from about 5 to about 100 mg. of the dye or mixture of dyes in about 1000 cc. of the flowable emulsion, the concentration of dye being varied according to the type of light-sensitive salt which goes to make up the emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol and a volume of this solution (which may be diluted with water) containing from 5 to 100 mg. of dye is slowly added to about 1000 cc. of a gelatino-silver-halide emulsion with stirring. Stirring is continued until the dye is uniformly and practically homogeneously dispersed. With the more powerful of these new sensitizing dyes 10 to 20 mg. of dye per 1000 cc. of emulsion suffice to produce the maximum sensitizing effect with the ordinary gelatino-silver-halide emulsions. The above statements are only illustrative and not to be understood as limiting our invention in any sense, as it will be apparent that these dyes can be incorporated by other methods in many of the photographic emulsions customarily employed in the art, such, for instance, as by bathing the plate or film, upon which the emulsion has been coated, in a solution of the dye in an appropriate solvent, although such a method is ordinarily not to be preferred. The claims are intended to cover any combination of these new dyes with a photographic silver salt emulsion whereby the dye exerts a sensitizing effect upon the emulsions as well as a photographic element comprising a support, ordinarily transparent, upon which the light-sensitive emulsion is coated or spread and permitted to set or dry.

What we claim and desire to be secured by Letters Patent of the United States of America is:

1. A photographic silver salt emulsion containing a trinuclear sensitizing dye of the following structure:

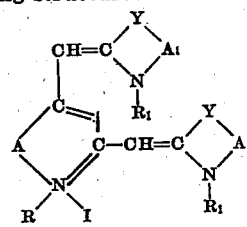

wherein A, $A_1$ and $A_2$ represent an organic residue selected from the group consisting of a vinylene, a phenylene and a naphthylene group, R, $R_1$ and $R_2$ represent an alkyl group, X represents an acid radical and Y represents an atom selected from the group consisting of oxygen, sulfur and selenium.

2. A photographic silver halide emulsion containing a trinuclear sensitizing dye of the following structure:

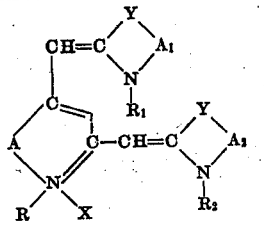

wherein A, $A_1$ and $A_2$ represent an organic residue selected from the group consisting of a vinylene, a phenylene and a naphthylene group, R, $R_1$ and $R_2$ represent an alkyl group, X represents an acid radical and Y represents an atom selected from the group consisting of oxygen, sulfur and selenium.

3. A photographic gelatino-silver-halide emulsion containing a trinuclear sensitizing dye of the following structure:

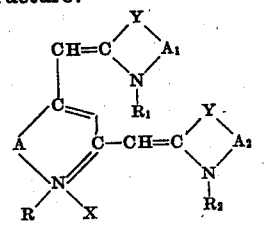

wherein A, $A_1$ and $A_2$ represent an organic residue selected from the group consisting of a vinylene, a phenylene and a naphthylene group, R, $R_1$ and $R_2$ represent an alkyl group, X represents an acid radical and Y represents an atom selected from the group consisting of oxygen, sulfur and selenium.

4. A photographic gelatino-silver-halide emulsion containing a trinuclear sensitizing dye of the following structure:

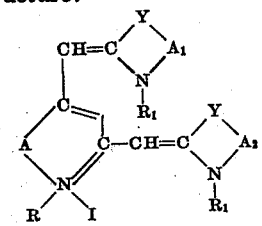

wherein A, $A_1$ and $A_2$ represent an organic residue selected from the group consisting of a vinylene, a phenylene and a naphthylene group, R, $R_1$ and $R_2$ represent an alkyl group and Y represents an atom selected from the group consisting of oxygen, sulfur and selenium.

5. A photographic gelatino-silver-chloride emulsion containing a trinuclear sensitizing dye of the following structure:

wherein A, $A_1$ and $A_2$ represent an organic residue selected from the group consisting of a vinylene, a phenylene and a naphthylene group, R, $R_1$ and $R_2$ represent an alkyl group and Y represents an atom selected from the group consisting of oxygen, sulfur and selenium.

6. A photographic gelatino-silver-halide emulsion containing a sensitizing dye selected from the group consisting of 2,4-di-[(2-alkyl-1(2)-benzoxazylidene, benzothiazylidene and benzoselenazylidene) methyl] quinoline alkyl quaternary salts.

7. A photographic gelatino-silver-halide emulsion containing a sensitizing dye selected from the group consisting of 2,4-di-[(2-alkyl-1(2)-benzoxazylidene, benzothiazylidene and benzoselenazylidene) methyl] quinoline alkiodides.

8. A photographic gelatino-silver-chloride emulsion containing a sensitizing dye selected from the group consisting of 2,4-di-[(2-alkyl-1(2)-benzoxazylidene, benzothiazylidene and benzoselenazylidene) methyl] quinoline alkiodides.

9. A photographic gelatino-silver-halide emulsion containing a sensitizing dye selected from the group consisting of 2,4-di-[(2-alkyl-1(2)-benzothiazylidene) methyl] quinoline alkyl quaternary salts.

10. A photographic gelatino-silver-halide emulsion containing a sensitizing dye selected from the group consisting of 2,4-di-[(2-alkyl-1(2)-benzothiazylidene) methyl] quinoline alkiodides.

11. A photographic gelatino-silver-halide emulsion containing a 2,4-di-[(2-ethyl-1(2)-benzothiazylidene) methyl] quinoline ethiodide.

12. A photographic gelatino-silver-chloride emulsion containing a sensitizing dye selected from the group consisting of 2,4-di-[(2-alkyl-1(2)-benzothiazylidene) methyl] quinoline alkyl quaternary salts.

13. A photographic gelatino-silver-chloride emulsion containing a sensitizing dye selected from the group consisting of 2,4-di-[(2-alkyl-1(2)-benzothiazylidene) methyl] quinoline alkiodides.

14. A photographic gelatino-silver-chloride emulsion containing a 2,4-di-[(2-ethyl-1(2)-benzothiazylidene) methyl] quinoline ethiodide.

15. A photographic gelatino-silver-halide emulsion containing a sensitizing dye selected from the group consisting of 2,4-di-[(2-alkyl-1(2)-benzoselenazylidene) methyl] quinoline alkyl quaternary salts.

16. A photographic gelatino-silver-halide emulsion containing a sensitizing dye selected from the group consisting of 2,4-di-[(2-alkyl-1(2)-benzoselenazylidene) methyl] quinoline alkiodides.

17. A photographic gelatino-silver-halide emulsion containing a 2,4-di-[(2-ethyl-1(2)-benzoselenazylidene) methyl] quinoline ethiodide.

LESLIE G. S. BROOKER.
LLOYD A. SMITH.